(12) United States Patent
Oswal et al.

(10) Patent No.: US 7,885,144 B2
(45) Date of Patent: Feb. 8, 2011

(54) TIME-DEPENDANT GAIN CONTROL FOR AN AMPLIFIER USED IN RECEIVING ECHOES

(75) Inventors: Sandeep Oswal, Bangalore (IN); Jagannathan Venkataraman, Bangalore (IN); Visvesvaraya Appala Pentakota, Bangalore (IN); Shagun Dusad, Jaipur (IN)

(73) Assignee: Texas Instruments Incorporated, Dallas, TX (US)

( * ) Notice: Subject to any disclaimer, the term of this patent is extended or adjusted under 35 U.S.C. 154(b) by 312 days.

(21) Appl. No.: 12/241,075

(22) Filed: Sep. 30, 2008

(65) Prior Publication Data

US 2010/0080083 A1   Apr. 1, 2010

(51) Int. Cl.
*G01S 15/00* (2006.01)

(52) U.S. Cl. .......................................... 367/98; 367/65

(58) Field of Classification Search ............. 367/65, 367/66, 67, 98
See application file for complete search history.

(56) References Cited

U.S. PATENT DOCUMENTS 5,077,701 A * 12/1991 Lill .............................. 367/98
7,139,220 B2 * 11/2006 Tolciu .......................... 367/98

* cited by examiner

*Primary Examiner*—Ian J Lobo
(74) *Attorney, Agent, or Firm*—Steven A. Shaw; W. James Brady; Frederick J. Telecky, Jr.

(57) ABSTRACT

An amplifier circuit to amplify a sequence of echoes and to generate a corresponding sequence of amplified signals. In an embodiment, the amplifier includes an operational amplifier, with variable input and feedback resistances such that the ratio of the two resistances can be controlled. A gain control block controls the ratio in a time dependent manner to obtain desired gain factors for each of the echoes. The gain factors can be pre-computed such that all the echoes are gained to the same level in case of an ultra-sound system.

18 Claims, 6 Drawing Sheets

TIME-DEPENDANT GAIN CONTROL FOR AN AMPLIFIER USED IN RECEIVING ECHOES

BACKGROUND OF THE INVENTION

1. Technical Field

The present disclosure relates generally to amplifiers, and more specifically to time-dependant gain control for an amplifier used in receiving echoes.

2. Related Art

Amplifiers generally refer to circuits and/or components, which amplify an input signal by a desired gain. The gain factor determines the degree of amplification as is well known in the relevant arts. There are several situations in which time dependent gain control is to be employed in amplifiers. Time dependency implies that the gain factor is not necessarily the same in all time instances.

There are several systems which need to process echoes of a previously transmitted signal. For example, ultrasound systems transmit sound waves/pulses of very high frequencies (typically higher than the upper limit of human hearing), and process reflections (or echoes) from surfaces or objects to form visual and/or other information pertaining to the objects. Echo based technology is used in areas such medical imaging, radars, and industrial/manufacturing environments, as is also well known in the relevant arts.

As an illustration, in an ultrasound system, transmit pulses are typically generated as electrical signals (current, voltage, etc), and provided to a transducer array that converts the electrical signals to ultrasonic sound energy, and transmits the ultrasound energy pulses. Reflected sound pulses are converted back to electrical form by the transducer array. A sound pulse when reflected from an object (surface in general) closer to the transducer may have a greater strength/amplitude when received back at the transducer array, while reflections from surfaces farther away are generally smaller in strength.

Thus, reflections arising from a single transmitted ultrasound pulse may be received back in the ultrasound system in the form of a pulse train, with an earlier received pulse in the pulse train having a greater strength/amplitude than successively later received ones. The corresponding (received) electrical pulses (echoes of the transmitted pulse) generated by the transducer also have similar amplitudes. Therefore, amplifiers provided in receive chains (paths) in the ultrasound system typically need to alter their respective gains in a time-dependent manner to cause all (or most of) the reflected (electrical) pulses to have substantially the same amplitudes.

Amplifiers and corresponding techniques for implementing such time-dependent gain control in the receive chains of an ultrasound system may need to be provided while satisfying one or more requirements, such as gain accuracy, minimal additional noise, immunity from temperature and process variations, etc. Several aspects of the present invention address one or more of the above noted requirements, and provide an improved amplifier for time-dependant gain control in an ultrasound system.

SUMMARY

An amplifier circuit provided according to an aspect of the present invention amplifies a sequence of echoes and generates a corresponding sequence of amplified signals. In an embodiment, the amplifier contains an operational amplifier, with the ratio of the input and feedback resistances being configurable. As the ratio determines the gain factor, a gain control block conveniently controls the ratio in a time dependent manner to obtain desired gain factors for each of the echoes.

In one embodiment, the features are implemented in an ultrasound system and the gain factors are pre-computed such that all the echoes are gained to the same level. The system then contains an array of transducers, to together transmit an ultrasonic sound pulse and to thereafter receive echoes representing reflections of the pulse from external surfaces.

According to another aspect of the present invention, each of the resistances is implemented as a set of resistors and a set of switches, wherein a desired value of the resistance is obtained by closing some of said set of switches and opening the others. Due to such use of resistors, mismatches due to temperature and process variations are minimized, thereby enabling the gain values to be accurately realized during operation.

According to yet another aspect of the present invention, the input signal to the amplifier is AC coupled, thereby reducing variations in the output offset component of the amplifier over the entire gain range, i.e., offset component at the output of the amplifier does not change with the gain programmed.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

Various features of the present invention are described in the context of an ultrasound system, though it should be appreciated that the features can be implemented in other systems such as radars, sonar systems, etc., which may rely on processing echo.

1. Example Ultrasound System

Figure 1:
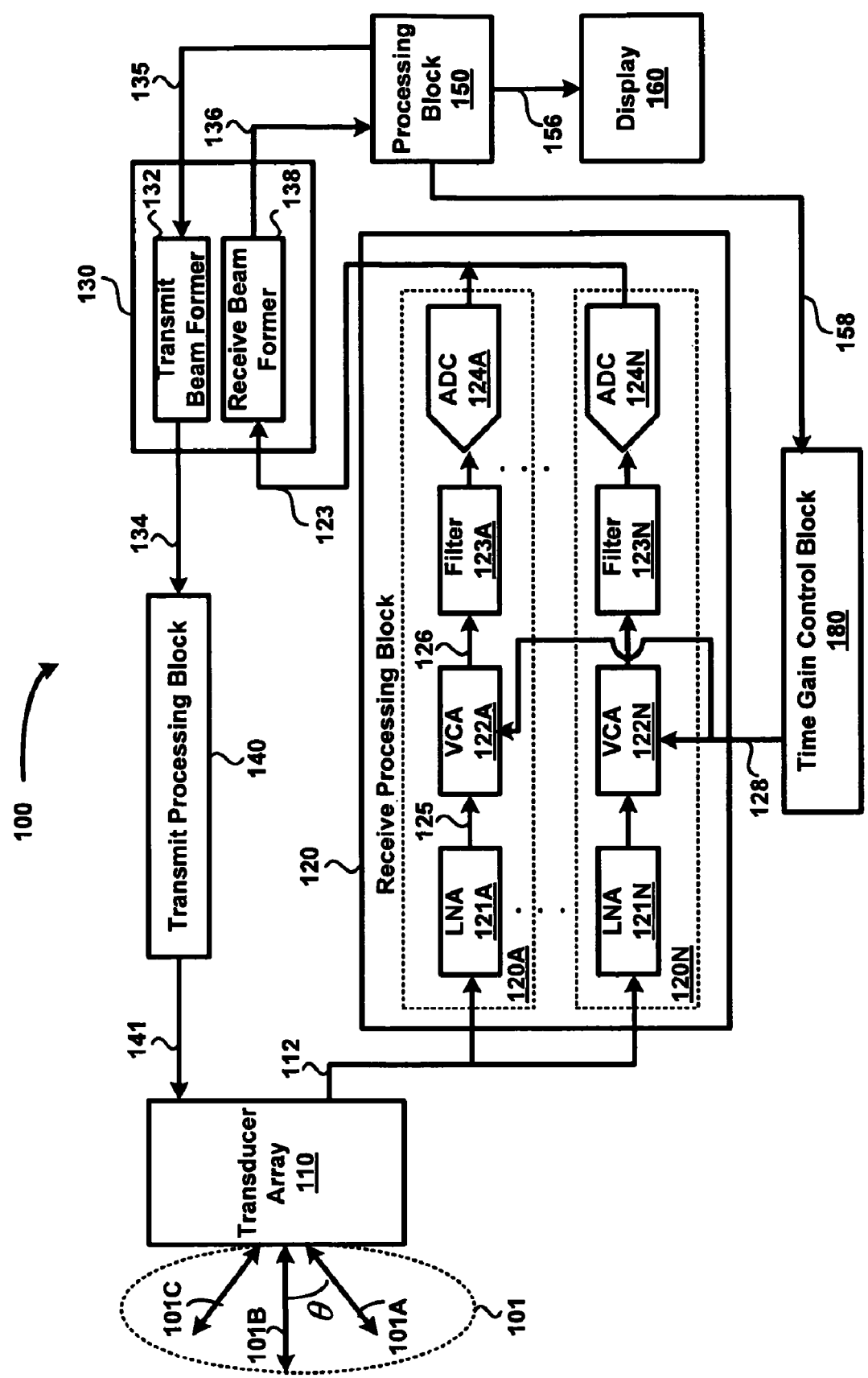
FIG. 1 is a block diagram illustrating various blocks of an ultrasound system.

FIG. 1 is a block diagram illustrating various blocks of an example ultrasound system, in which several aspects of the present invention can be implemented. Only those blocks and/or components of the system as required for an understanding of the present invention are illustrated and described. A typical ultrasound system may have various other components/ blocks to provide corresponding features. Ultrasound system 100 is shown containing transducer array 110, receive processing block 120, beam forming block 130, transmit processing block 140, processing block 150, display 160 and time gain control block 180.

Transducer array 110 contains an array of transducers to convert electrical signals to sound of ultrasonic frequency, and vice versa. Transducer array 110 may contain multiple transducers arranged spatially in a desired pattern (for example, in a linear fashion, with transducers arranged side by side in a straight line). By controlling the characteristics (such as phase and amplitude) of the electrical signals provided as inputs (via path 141) to each of the transducers, transducer array 110 may be caused to transmit a pulse (101) in a desired direction or angle ($\theta$).

As an illustration, arrows 101A, 101B and 101C are shown in FIG. 1 as three possible beam directions. After transmitting a pulse, the transducers in transducer array 110 immediately switch to receive mode. In receive mode, the transducers receive reflected pulses from various surfaces. The reflected pulses may be received along any direction. Transducers in transducer array 110 convert the received ultrasound pulses to corresponding electrical signals, and forward the electrical pulses on path 112 to receive processing block 120. The number/label 101 is used below to refer to both transmitted as well as received ultrasound pulses.

Beam forming unit 130 is shown containing transmit beam former 132 and receive beam former 138. Transmit beam former 132 may receive a command from processing block 150 via path 135, forms a transmit beam (which may be in the form of a directional pulse when transmitted from path 101 as noted above), and forwards the data representing the pulse (or beam) to be transmitted to transmit processing block 140 via path 134. Alternatively, beam forming unit 130 may contain a control unit (not shown) that controls the operation of transmit beam former 132 (as well as receive beam former 138, described below). The transmit beam may be formed using electronic beam forming techniques, such as using phased arrays, etc, well known in the relevant arts.

Transmit processing block 140 receives the data sent by transmit beam former 132 via path 134, and performs several operations on the data, such as digital to analog conversion, filtering, amplification, etc. Transmit processing block provides the processed analog signal(s) to transducers in transducer array 110.

Receive processing block 120 receives from transducer array 110 (via path 112) electrical signals (e.g., pulses/echoes of the transmitted pulse) representing reflected sound pulses. Receive processing block 120 performs various operations on the received pulses such as amplification, filtering and analog to digital conversion, and provides the processed information to receive beam former 138 via path 123. Receive processing block 120 is shown containing multiple processing chains (120A through 120N), with each chain processing a signal received from a corresponding one of the (A through N) transducers in transducer array 110.

Chain 120A is shown containing low noise amplifier (LNA) 121A, voltage controlled amplifier (VCA) 122A, anti-aliasing filter (filter 123A), and analog to digital converter (ADC 124A). Chain 120N is similarly shown containing low noise amplifier (LNA) 121N, voltage controlled amplifier (VCA) 122N, anti-aliasing filter (filter 123N), and analog to digital converter (ADC 124N).

Receive beam former 138 receives the outputs of each of chains 120A through 120N, and operates to determine the direction (101) along which each reflected pulse is received, and forwards the corresponding information to processing block 150, on path 136. Although not shown, the data from each of the chains may be serialized and provided on path 136 using interfaces such as LVDS (low voltage differential signaling). As is well known, the operations performed in receive beam former 138 enable (in processor 150) the creation of images (which may be displayed by processing block 150 on display 160) representing the surfaces/objects off which the transmit pulses are reflected.

One of several well-known techniques may be employed in receive beam former 138 to perform the corresponding beam forming operations. Beam forming block 130, containing transmit and receive beam formers 132 and 138 respectively may be implemented using a "beam forming" ASIC (application specific integrated circuit). The operation of receive beam former 138 may be controlled by a control unit contained within beam forming unit 130, or may be controlled by processor 150, depending on the specific implementation.

Processing block 150 may signal transmit beam former 132 to generate transmit pulses (or beams). Processing block 150 receives reflected pulses provided by receive beam former 138, and operates to create representations of image(s) (image data) representing the objects or surfaces that reflected the transmitted pulse. Processing block 150 provides the image data to display 160 (via path 156), which displays the image. Processing block 150 may be implemented using various approaches. For example, processing block 150 may be implemented as a digital signal processor (DSP) to execute various algorithms to generate the image data. Some of the processing operations performed by processing block 150 include Doppler processing, 2D and 3D image generation, etc, as is well known in the relevant arts.

Figure 2A:
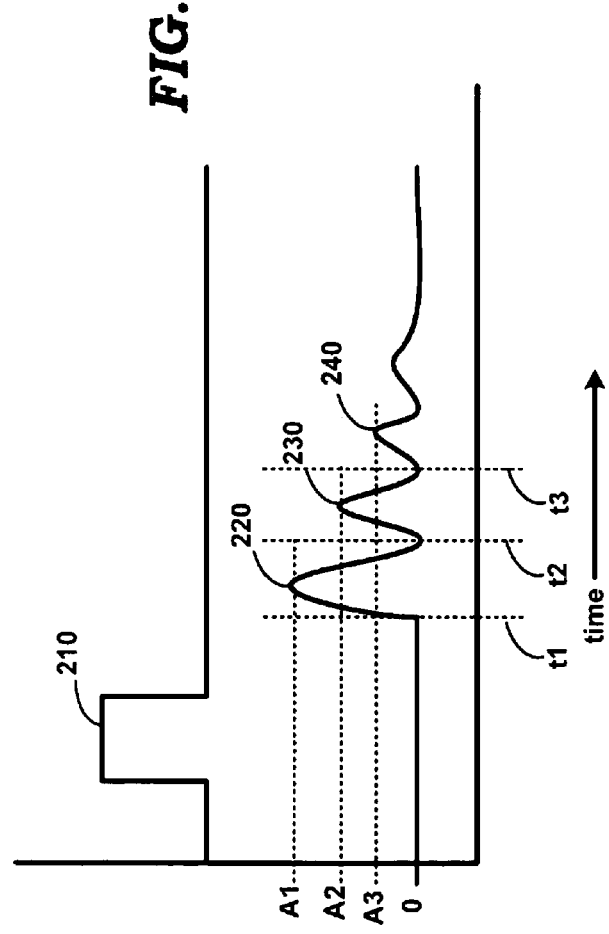
FIG. 2A is a timing diagram illustrating transmitted and received pulses in an ultrasound system.
Figure 2B:
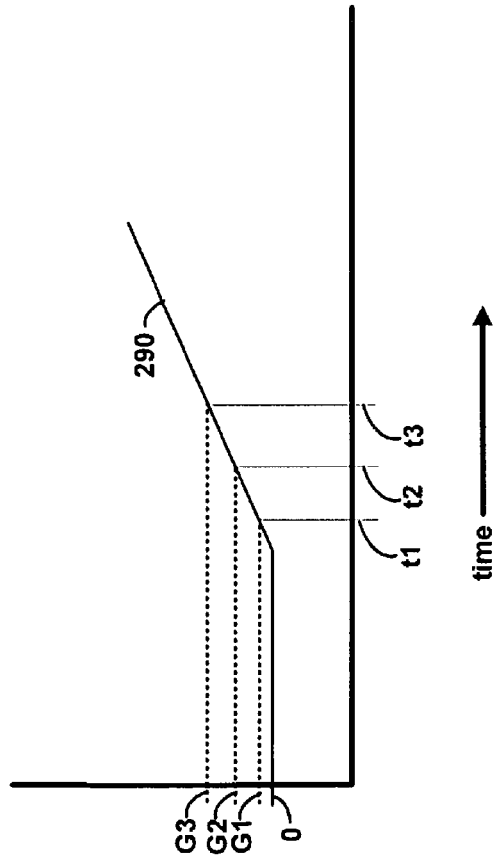
FIG. 2B is a timing diagram illustrating an example time-dependent gain control curve according to which gain settings for an amplifier in an ultrasound system may be provided.

Time gain control block 180 operates to provide control signals (on path 128) to each of the VCAs (VCA 122A through VCA 122N) to adjust the gain of the corresponding VCA to cause the reflected pulse amplitudes to be all scaled to a same desired level. The operation of time gain control block in providing the time-gain control values to the VCAs may be coordinated by processing block 150 (via path 158), or by a control unit (not shown) within beam forming unit 130. An illustration of time-gain control is provided with respect to FIGS. 2A and 2B. FIGS. 2A and 2B are provided merely by way of illustration, and real-world transmit and receive pulses may have different characteristics in terms of time, phase, amplitude, etc.

In FIG. 2A, pulse 210 represents a transmit pulse as may be transmitted on path 141. Although pulse 210 is shown as a square pulse, other waveforms such as sinusoidal waveforms may also be employed, as is well known in the relevant arts. Some of the corresponding reflected receive pulses (echoes) are shown denoted as 220, 230, and 240, and as commencing (received) at time instances t1, t2 and t3 respectively.

Pulse 220 may represent a reflection from a surface closest to transducer array 110 and is shown as having (a larger) amplitude A1, while pulses 230 and 240 may represent reflections from surfaces farther away from transducer array 110, and are shown as having amplitudes A2 and A3 respectively. FIG. 2B (also shown at the same time scale as FIG. 2A) shows gain curve 290 according to which gain values may need to be provided by time gain control block 180 to each VCAs 122A through 122N.

Gain values G1, G2 and G3 represent respectively the gain values that may be provided corresponding to pulses 220, 230 and 240 of FIG. 2A. Though the gain values there are shown as being linear, it should be appreciated that the values can have any other relationship (e.g., non-linear), as is suited in the specific environment.

As noted above, receive processing block 120 may contain multiple processing chains, with the corresponding components in each chain performing respective operations. For example, with respect to chain 120A, LNA 121A provides amplification to a received electrical signal on path 112 (representing a reflected pulse) with minimum noise addition, and forwards the amplified signal to VCA 122A on path 125.

VCA 122A provides a variable gain to enable all received pulses (corresponding to a single transmitted pulse) to be amplified to a desired same amplitude level. Generally, the desired same level may be equal to the full-scale range of the ADC in the chain (ADC 124A with respect to chain 120A). The output (126) of VCA 122A is provided to anti-aliasing filter 123A, which removes frequency components above a desired frequency (at least greater than half the sampling frequency (Nyquist frequency) of ADC 124A). ADC 124A samples the gained and anti-alias filtered signal received from anti-alias filter 123A at corresponding sampling time instances to generate corresponding digital codes. ADC 124A forwards the digital codes on path 123 to receive beam former 138. The LNAs, VCAs, filters and ADCs of chains 120B-120N perform similar operations.

The implementation details of an amplifier for time gain control in a prior embodiment are described next.

2. Prior Time Gain Control

Figure 3:
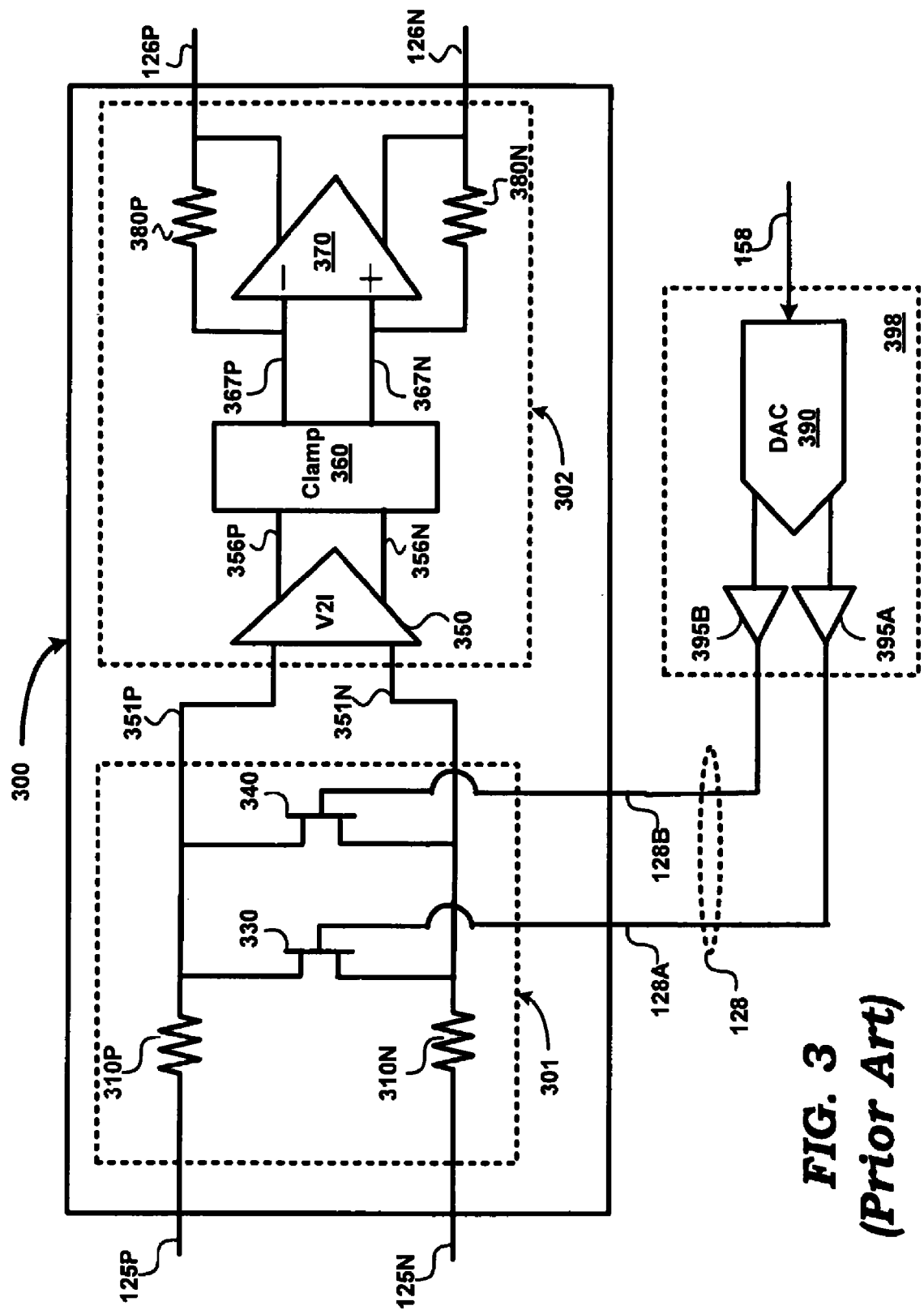
FIG. 3 is a block diagram of a circuit providing time-dependent gain control according to a prior approach.

FIG. 3 is a diagram illustrating the manner in which time-gain control is provided to an amplifier according to a prior approach. The diagram is shown containing (VCA) 300 and time gain control block 398, which respectively can be used in place of any of VCAs 122A-122N and time gain control block 180 of FIG. 1. Prior VCA 300 is shown as processing differential signals, and is shown containing an attenuator portion (301), and an amplifier portion 302. Attenuator 301 is shown containing resistors 310P and 310N, and MOSFET transistors 330 and 340, while amplifier 302 is shown containing voltage-to-current (V2I) converter 350, clamp 360, OPAMP (operational amplifier) 370, and feedback resistors 380P and 380N.

V2I 350 converts a differential voltage across paths 351P and 351N to a corresponding differential current loop (provided along paths 356P and 356N). OPAMP 370 and resistors 380P and 380N are configured to operate as a current to voltage (I2V) amplifier, and operate to provide all of the (fixed) gain (positive gain) of VCA 300. Resistors 380P and 380N are selected to provide the desired fixed positive gain.

Clamp 360 operates to limit the current on paths 356P/356N (when input signal 125P/125N is very large), thereby ensuring that the clipping does not occur in ADC 124A (ADC's total dynamic range is not exceeded). Such clipping may otherwise cause undesirable effects, at least in certain operating scenarios. For example, when making Doppler measurements to capture movement of objects (measuring blood flow, etc), a reflected pulse (of a sinusoidal waveform) at the transmit frequency may have a much larger amplitude than a reflected pulse having a Doppler shifted frequency (and which may be the primary signal of interest in identifying movement). Assuming both reflected pulses are received substantially simultaneously, the sum of the pulses may cause clipping in the ADC, making it difficult to estimate the strength of the Doppler shifted pulse. Clamp 360, thus, avoids or minimizes such signal clipping.

Attenuator 301 may be viewed as a voltage divider circuit, with the resistance of transistors 330 and 340 being controllable (via control paths 128A and 128B respectively), to provide a desired attenuation to input signal 125P/125N (which, for illustration is shown corresponding to the signal on path 125 of FIG. 1). When a large attenuation is desired, the ON resistances of transistors 330 and 340 are caused to be set (by the corresponding control signals) to a very small value. For smaller attenuations, the control signals are varied correspondingly to cause larger ON resistances to be set for transistors 330 and 340. When no attenuation is desired (corresponding to a very small input signal 125P/125N), both transistors 330 and 340 may be turned off. The provision of two transistors (330 and 340) enables a wider range of attenuation to be provided, with one of the two transistor being controlled for a first range attenuations (the other being OFF), and both of the transistors being controlled for a second (higher) range of attenuation.

DAC (digital to analog converter) 390 of time gain control block 398 receives control values in digital form via path 158, with the control values specifying the attenuation to be provided at corresponding time instances. Alternatively, the control values may be retrieved by DAC 390 from a memory (not shown). DAC 390 provides analog voltages corresponding to each digital control value to one or both (depending on the specific attenuation realizable using transistors 330 and 340) of buffers 395A and 395B. The analog control voltages are buffered by buffers 395A and 395, and provided to the gate terminals of transistors 330 and 340. Thus, time gain control of amplifier 300 is achieved by using a variable attenuator (301) followed by a fixed gain amplifier (302).

The prior approach described above may have some drawbacks. Firstly, the characteristics of the MOS transistors 330 and 340 may vary depending on (manufacturing) process and operating temperature variations. Resistors (310P and 310N) and MOS transistors (330 and 340) being different component types, the respective variations in their operating characteristics (such as the resistances they exhibit) may be different (and uncorrelated) across process and temperature variations. Thus, there may be mismatches in the variations. Due to the effects noted above, gain provided by amplifier 300 also varies with temperature and process variations (for a same desired gain setting).

Secondly, since amplifier 300 attenuates the signal first and then follows it up with a gain stage (amplifier 302) any noise generated in the fixed gain amplifier (302) is gained 'input referred', i.e., the signal (351P/351N) that is provided to the fixed gain amplifier (302) is attenuated when a low gain is desired, and therefore adds to any noise of the fixed gain amplifier (302). Typically, the use of attenuator 302 introduces more noise when overall gain (total gain of VCA 300) is low (attenuation of attenuator 301 is high). Further, the analog control voltages (128) controlling the gate terminals of transistors 330 and 340 may also contribute to noise. Noise contribution of attenuator 301 may be lower when the overall gain is high.

Further, noise in (due to) the analog control voltages (128) may be correlated among the chains 120A-120N, since the same control signal(s) 128 are provided to control the gain of each of the VCAs (FIG. 1). As a result overall signal to noise ratio (SNR) of the signal provided to receive beam former 138 on path 123 (FIG. 1) may be degraded, the degradation being difficult to nullify due to the noise being correlated. In general, one or more of the drawbacks noted above cause gains provided by VCA 300 to have inaccuracies, which degrades the performance of the entire system in which VCA 300 is employed.

Several features of the present invention provide improved time-dependent gain control for an amplifier, and are described next with examples.

3. Improved Time-Dependant Gain Control

Figure 4:
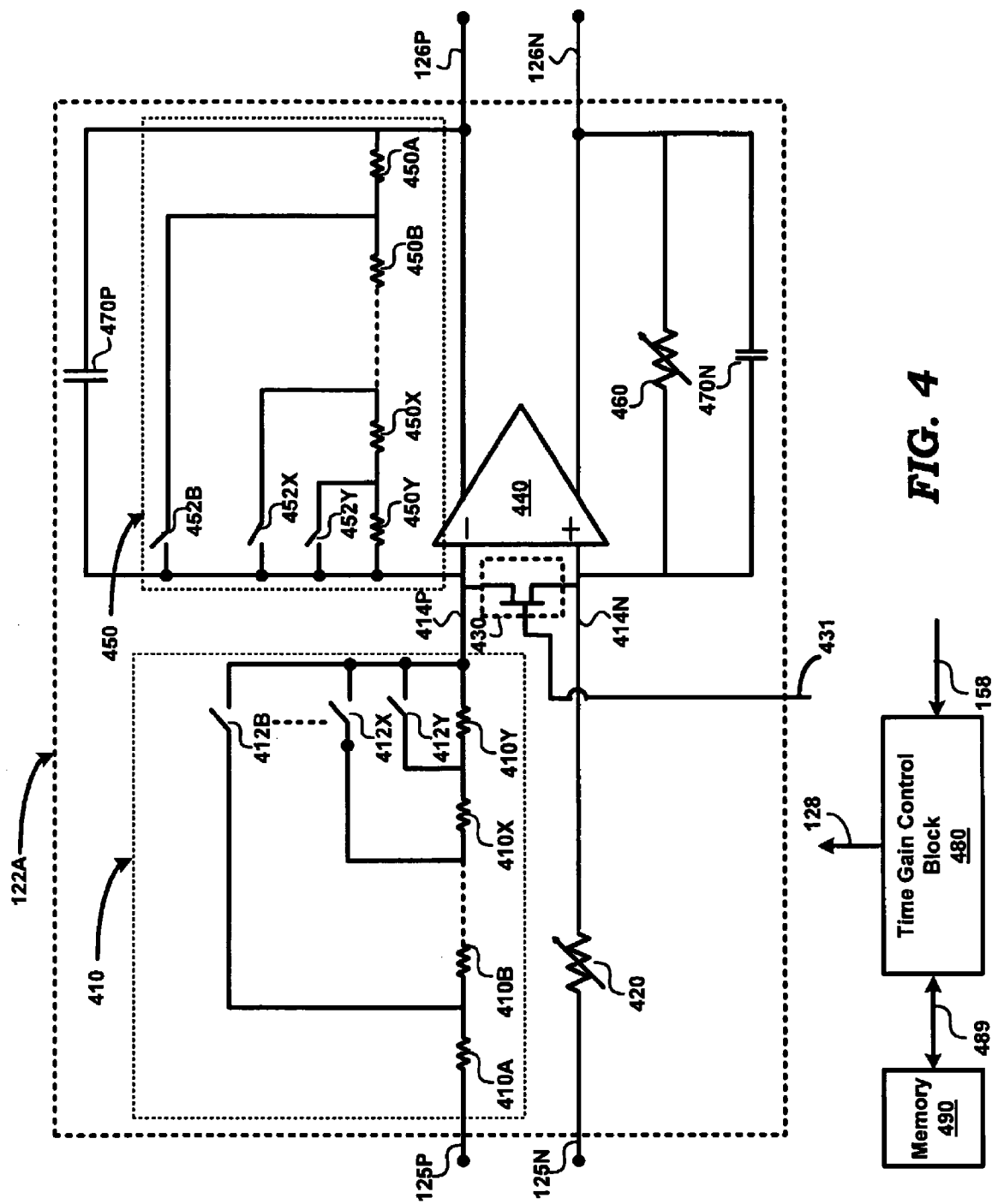
FIG. 4 is a diagram of a circuit providing time-dependent gain control in an embodiment of the present invention.

FIG. 4 is a diagram illustrating the manner in which time-dependant gain control for an amplifier is implemented in an embodiment of the present invention. The diagram is shown containing amplifier 122A, time gain control block 480, and memory 490. It is assumed that the circuit of FIG. 4 is contained in a system in which echoes are processed. Accordingly, amplifier 122A may be used in place of similarly labeled VCA 122A of FIG. 1, while time gain control block 480 may be used in place of time gain control block 180 of FIG. 1.

Amplifier 122A is shown implemented to process differential signals, and containing OPAMP 440, and variable gain setting resistances (in general, impedances) 410, 450, 420 and 460, capacitors 470P and 470N, and clamp 430. Nodes 414P and 414N are the input terminals of OPAMP 440, while nodes 126P and 126N are the output terminals (and in the context of the system of FIG. 1, are deemed to be contained in path 126). Also, in the context of the system of FIG. 1, input paths 125P and 125N are deemed to be contained in path 125. Variable resistances 410 and 420 are respectively connected between input node 125P and node 414P, and input node 125N and node 414N. Variable resistances 450 and 460 (feedback resistances) are respectively connected in feedback paths between the corresponding input and output terminals of OPAMP 440.

In operation, resistances 410 and 420 are set to equal values, and resistances 450 and 460 are set to equal values (in a same duration, to support differential operation). Gain provided by amplifier 122A is determined by the ratio of resistances 450 and 410 (or 460 and 420), and equals R2/R1, wherein R2 is the value of resistance 450 (or 460), and R1 is the value of resistance 410 (or 420).

Resistance 410 is shown implemented containing multiple individual resistors 410A through 410Y, connected in series. Each of switches 412B through 412Y may be closed (opened) to connect (disconnect) respective resistors 410B through 410Y in the path from input 125P, through resistor 410A to node 414P (414P being an input terminal of OPAMP 440). Although not shown in the Figure, resistance 420 is implemented in a manner similar to that shown with respect to resistance 410.

Resistance 450 is shown implemented containing multiple individual resistors 450A through 450Y, connected in series. Each of switches 452B through 452Y may be closed (opened) to connect (disconnect) respective resistors 450B through 450Y in the feedback path from input terminal 414P, through resistor 450A to output node 126P. Although not shown in the Figure, resistance 460 is implemented in a manner similar to that shown with respect to resistance 450. It should be appreciated that the resistors may be connected in other configurations (e.g., parallel or as a combination of serial and parallel), without departing from the spirit and scope of several aspects of the present invention.

Digital values representing the desired gain settings may be stored in memory 490. The digital values for corresponding time instances may be predetermined, and stored in memory 490 in a suitable manner (not shown). In the alternative, time gain control block 480 may be provided the values directly via path 158 (by a processing block such as processing block 150 of FIG. 1).

Time gain control block 480 opens and/or closes the corresponding switches (which may, for example, be implemented using MOS transistors) depending on the specific gain that is required to be provided by amplifier 122A. Corresponding to each time instance, time gain control block 480 retrieves via path 489 from memory 490, digital values representing the corresponding required gain, determines which of the switches need to be opened and/or closed, and provides digital control signals (configuration signals on path 128) to open and /or close the corresponding switches. Time gain control block 480, thus, operates to provide control (configuration) signals to cause amplifier 122A to provide a time-dependent gain.

In an embodiment of the present invention, time gain control block 480 controls the value of resistances 410 and 420 to provide 'coarse' gain settings, and feedback resistances 450 and 460 to provide 'fine' gain settings. In one embodiment, the values of feedback resistances are controllable to provide a 'fine' gain range of 0 dB (decibels) to 1 dB in steps of 0.125 dB. 'Coarse' switches associated with resistances 410 and 420 are controllable to provide gain in steps of 1 dB. During physical design of amplifier 122A and connections to time gain control block 480, it is ensured that path delays encountered by the digital switch control signals (configuration signals, sent on path 128) in travelling from time gain control block 480 to the corresponding switches are matched (made substantially equal).

Such matching ensures that when a gain value needs to be changed across a 1 dB boundary (for example, from 2.875 dB to 3.125 dB) corresponding switches controlling resistances 450 and 460 are opened substantially simultaneously as switch(es) controlling resistances 410 and 420 are closed. Thus, any glitches which may otherwise cause an unintended gain setting (glitches) are avoided (switch connection make and break occur almost simultaneously).

In an embodiment of the present invention, the input and feedback resistances are switched synchronous to the sampling clock of the following ADC (ADC 124A of FIG. 1). As a result transient glitches expected in digital switching of gain as a function of time are eliminated, and enables interpolation of gain between the input and feedback elements and provision of very fine gain sweep. In the embodiment, a 0.125 dB gain step with a gain range of (−6 dB to +30 dB) is implemented.

Capacitors 470P and 470N in combination respectively with resistances 450 and 460 operate as a filter to provide the anti-alias filtering operation provided by filter 123A of FIG. 1. Clamp 430 is implemented as a MOS transistor, with its gate terminal being provided a bias voltage (431). When the input signal across nodes 125P/125N has a magnitude such that output signal 126P/126N exceeds the linear range of OPAMP 440 (overload condition), signal across input terminals 414P/414N of OPAMP 440 also has a correspondingly high (differential) magnitude.

Bias voltage 431 is a predetermined bias voltage derived in a manner, such that during normal operating conditions (no overload), voltage across input terminals 414P/414N cause MOS transistor 430 to be in a switched off condition. In an overload condition, the input terminals 414P/414N experience wide signal swings, and cause MOS transistor 430 to be switched on, thereby causing MOS transistor 430 to shunt signal current through it, and not allowing OPAMP 440 to go into an overload condition. Bias voltage 431 may be generated in a known way.

Amplifier 122A thus implemented provides gain which is rendered substantially immune to temperature and/or process variations, since gain is determined and varied entirely by variable resistors (as against a combination of resistors and MOS transistors of the prior approach). Resistors in resistances 410, 420, 450 and 460 may be closely matched during fabrication.

Since an attenuator is not used, noise contribution of amplifier 122A is better (lesser) in comparison with the circuit of FIG. 3. In contrast to the prior approach, gain control is obtained in the circuit of FIG. 4 by opening/closing switches using digital signals. Therefore inaccuracies due to analog nature of control in the prior approach are not present in the present invention.

One drawback with the approach of FIG. 4 is that the contribution of input offset voltage at input terminals of OPAMP 440 to the output voltage across output terminals 126P and 126N may be different for different gain settings. Also, the input offset at the input terminals 125P/125N due to an offset of a component/block that drives 125P/125N will also be see different output gain to the for different gain settings.

Figure 5:
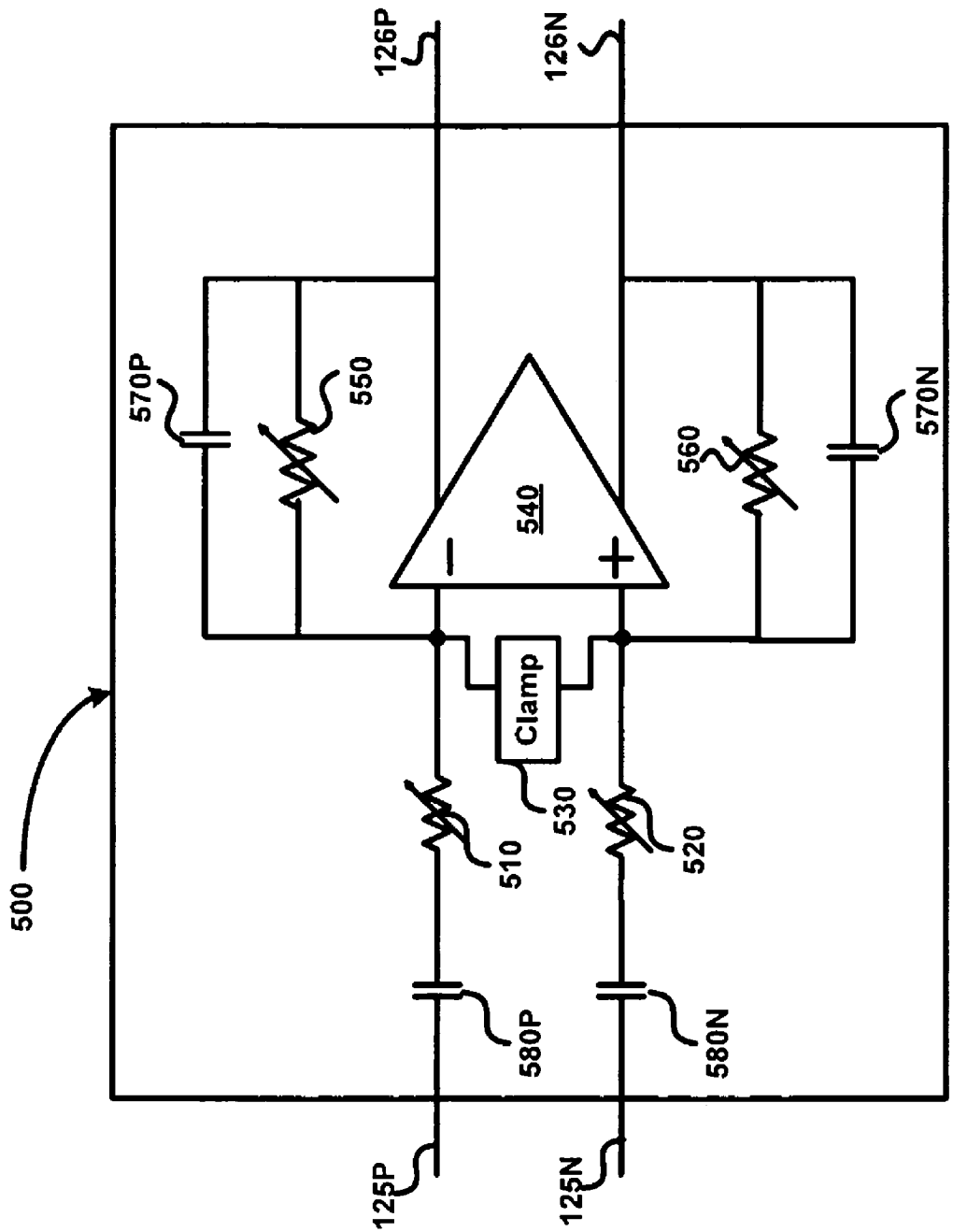
FIG. 5 is a diagram of an amplifier used to provide time-dependent gain control in another embodiment of the present invention.

An embodiment in which the output offset across terminals 126P and 126N is maintained constant is illustrated with respect to amplifier 500 in FIG. 5. OPAMP 540, variable resistances 510, 520, 550 and 560, clamp 530, and capacitors 570P and 570N correspond respectively to OPAMP 440, variable resistances 410, 420, 450 and 460, clamp 430, and capacitors 470P and 470N of FIG. 4. Capacitors 580P and 580N are provided, in addition, to AC-couple input 125P/125N to OPAMP 540. The effect of such AC-coupling maintains a constant output offset voltage across output terminals 126P and 126N, irrespective of the gain setting obtained by varying the resistances. Thus, time-dependent gain control may be provided with substantially constant output offset voltage due to the OPAMP, and/or any additional input offset at input 125P/125N.

The circuit of FIG. 5 may, however, have a drawback, in that the series combination of capacitor 580P and resistance 510 (as well as the series combination of capacitor 580N and resistance 520) may operate as a high pass filter with corresponding corner frequencies that vary with the gain setting, due to the variation in resistance 510 (and 520). One way to at least partially overcome the problem noted above is implement the AC-coupling capacitors 580P and 580N to have large capacitance values. However, such an approach may require larger implementation area for the capacitors.

An embodiment of the present invention addressing the gain dependent high pass corner frequency problem noted above is described next.

4. Rendering High Pass Corner Frequencies Independent of Gain Settings

Figure 6:
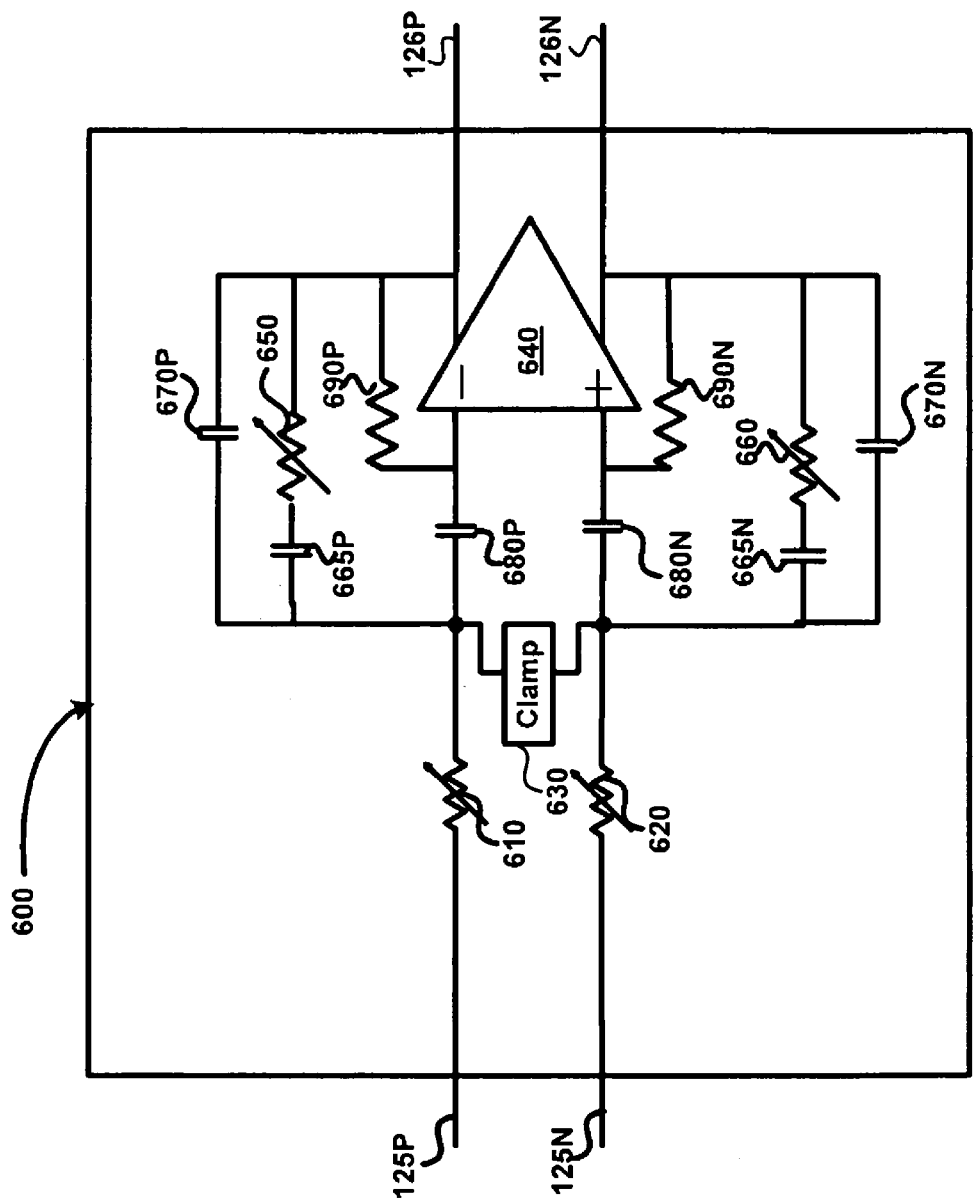
FIG. 6 is a diagram of an amplifier used to provide time-dependent gain control in yet another embodiment of the present invention.

FIG. 6 is a diagram illustration the details of an amplifier used for time gain control in an embodiment of the present invention. Amplifier 600, shown containing variable resistances 610, 620, 650 and 660, resistances 690P and 690N, capacitors 680P, 680N, 665P, 665N, 670P and 670N, and OPAMP 640. OPAMP 640, variable resistances 610, 620, 650 and 660, clamp 630, and capacitors 670P and 670N correspond respectively to OPAMP 540, variable resistances 510, 520, 550 and 560, clamp 530, and capacitors 570P and 570N of FIG. 4.

AC-coupling capacitors 680P and 690N are respectively provided between resistance 610 and one input terminal of OPAMP 640, and between resistance 620 and the other input terminal of OPAMP 640. Resistor 690P is provided between an input and an output terminal of OPAMP 640. Resistor 690N is provided between another input and another output terminal of OPAMP 640. Resistors 690P and 690N are implemented to have large resistance values, and are provided to enable proper bias voltages at the input terminals of OPAMP 640. Capacitors 665P and 665N are provided in series with feedback resistances 650 and 660 respectively, for removing the gain dependent output offset voltage due to the offset at the input terminals 125P/125N. Capacitors 680P and 680N are provided to remove gain dependent output offset voltages due to the offset at the input terminals of the OPAMP 640.

Capacitor values of capacitors 680P, 680N, 665P and 665N are selected such that at normal operating frequencies, these capacitors act as electrical shorts. With resistances 690P and 690N being very large compared with the maximum values of resistances 650 and 660, the circuit of FIG. 6 reduces to the circuit of FIG. 5 (minus capacitors 580P and 580N).

In FIG. 6, a high pass filter is formed by the combination of capacitor 680P and resistor 690P (and capacitor 680N and resistor 690N as well). Resistors 690P and 690N are predominant (effectively determine) in determining the corner frequency since their resistances are very large, the corner frequency being proportional to $1/[Rc*Cc]$, wherein Rc is the resistance of resistor 690P (or 690N), and Cc is the capacitance of capacitor 680P (or 680N).

It may be appreciated that the high pass filter thus formed has a relatively low corner frequency, and AC-coupling capacitors 680P and 680N may be implemented as small-valued capacitors requiring a smaller implementation area. Further, the high pass corner frequencies are now independent of the values (settings) of gain setting resistors 610 and 620, since it is the combination of resistor 690P and capacitor 680P (as well as resistor 690N and capacitor 680N) that form the high pass filter.

Thus, several features of the present invention may be used to provide a time-dependent gain with greater accuracy, greater immunity to variations in temperature and fabrication process, and less noise.

It should be appreciated that while the embodiments above have been described as using variable resistors to provide a desired gain, other components/impedances (such as capacitors) may also be used, with corresponding modifications to the respective circuits that will be apparent to one skilled in the relevant arts. Similarly, in instances where specific types of transistors (MOS, etc) are noted, it must be appreciated that such are noted are merely by way of illustration. Alternative embodiments using different configurations and types of transistors will be apparent to one skilled in the relevant arts by reading the disclosure provided herein. Furthermore, though various terminals in circuits described above are shown with direct connections to various other terminals, it should be appreciated that additional components (as suited for the specific environment) may also be present in the path, and accordingly the connections may be viewed as being electrically coupled to the same connected terminals.

In addition, the circuit topologies of FIGS. 4, 5 and 6 are merely representative. Various modifications, as suited for the specific environment, without departing from the scope and spirit of several aspects of the present invention, will be apparent to one skilled in the relevant arts by reading the disclosure provided herein.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A system comprising:
a transmitter to transmit a transmit signal;
a receiver to receive a sequence of echoes at a corresponding sequence of time instances;
an amplifier to amplify said sequence of echoes and to generate a corresponding sequence of amplified signals, said amplifier comprising:
an operational amplifier having an output terminal and an input terminal; and
a first impedance and a second impedance configurable to provide a desired impedance ratio according to a set of configuration signals, said first impedance being provided to couple an input signal to said input terminal and said second impedance being coupled as a feedback impedance between said output terminal and said input terminal whereby a gain provided by said operational amplifier is determined by the impedance ratio; and
a gain control block to receive a sequence of desired gains for said sequence of time instances, said gain control block to generate said set of configuration signals to obtain said impedance ratio which correspond to each of said sequence of desired gains for corresponding time instances.

2. The system of claim 1, wherein said system comprises an ultrasound system, said transmit signal is an ultrasonic sound pulse and wherein said sequence of echoes represent electrically, reflections of said ultrasonic sound pulse from an external surface.

3. The system of claim 1, wherein said first impedance is a first resistance and said second impedance is a second resistance.

4. The system of claim 3, wherein one of said first resistance and said second resistance is implemented as a set of resistors and a set of switches, wherein a desired value of the resistance is obtained by closing some of said set of switches and opening the others.

5. The system of claim 4, wherein said set of resistors are connected as a series of resistors, with a node connecting each pair of resistors being connected by a corresponding one of said set of switches to a common node, wherein the corresponding one of the switches is opened to add the component resistance to the total resistance offered by said series of resistors.

6. The system of claim 3, further comprising a first capacitor provided in series with said first impedance to AC couple said input signal to said amplifier.

7. The system of claim 3, further comprising:
a second capacitor coupled between said first impedance and said input terminal;
a third resistor coupled between said output terminal and a junction of said second capacitor and said first impedance; and
a third capacitor coupled between said junction and said second impedance.

8. The system of claim 3, further comprising:
a clamp circuit coupled between said input terminal and another input terminal of said operational amplifier.

9. The system of claim 3, wherein said sequence of echoes are provided in the form of a differential signal.

10. An ultrasound system comprising:
a transmitter to transmit a transmit signal;
a receiver to receive a sequence of echoes at a corresponding sequence of time instances;
an amplifier to amplify said sequence of echoes and to generate a corresponding sequence of amplified signals, said amplifier comprising:
an operational amplifier having an output terminal and an input terminal; and
a first impedance and a second impedance configurable to provide a desired impedance ratio according to a set of configuration signals, said first impedance being provided to couple an input signal to said input terminal and said second impedance being coupled as a feedback impedance between said output terminal and said input terminal whereby a gain provided by said operational amplifier is determined by the impedance ratio; and
a gain control block to receive a sequence of desired gains for said sequence of time instances, said gain control block to generate said set of configuration signals to obtain said impedance ratio which correspond to each of said sequence of desired gains for corresponding time instances,
wherein said transmit signal is an ultrasonic sound pulse and wherein said sequence of echoes represent electrically, reflections of said ultrasonic sound pulse from an external surface.

11. The ultrasound system of claim 10, further comprising a transducer array designed to receive electrical signals corresponding to said ultrasonic sound pulse and also to generate said sequence of echoes representing reflected ultrasonic sound pulses.

12. The ultrasound system of claim 10, wherein said first impedance is a first resistance and said second impedance is a second resistance.

13. The ultrasound system of claim 12, wherein one of said first resistance and said second resistance is implemented as a set of resistors and a set of switches, wherein a desired value of the resistance is obtained by closing some of said set of switches and opening the others.

14. The ultrasound system of claim 13, wherein said set of resistors are connected as a series of resistors, with a node connecting each pair of resistors being connected by a corresponding one of said set of switches to a common node, wherein the corresponding one of the switches is opened to add the component resistance to the total resistance offered by said series of resistors.

15. The ultrasound system of claim 12, further comprising a first capacitor provided in series with said first impedance to AC couple said input signal to said amplifier.

16. The ultrasound system of claim 12, further comprising:
a second capacitor coupled between said first impedance and said input terminal;
a third resistor coupled between said output terminal and a junction of said second capacitor and said first impedance; and
a third capacitor coupled between said junction and said second impedance.

17. The ultrasound system of claim 12, further comprising:
a clamp circuit coupled between said input terminal and another input terminal of said operational amplifier.

18. The ultrasound system of claim 12, wherein said sequence of echoes are provided in the form of a differential signal.

* * * * *